Oct. 26, 1954

M. M. LEVY 2,692,975

PULSE CODE SIGNALING SYSTEM

Filed Jan. 23, 1951

3 Sheets-Sheet 1

INVENTOR
Maurice Moise Levy

BY [signature]
ATTORNEY

INVENTOR
MAURICE MOISE LEVY
BY
ATTORNEY

Oct. 26, 1954 M. M. LEVY 2,692,975

PULSE CODE SIGNALING SYSTEM

Filed Jan. 23, 1951

3 Sheets-Sheet 3

INVENTOR
MAURICE MOISE LEVY
BY
ATTORNEY

Patented Oct. 26, 1954

2,692,975

UNITED STATES PATENT OFFICE 2,692,975

PULSE CODE SIGNALING SYSTEM

Maurice Moise Levy, London, England, assignor to The General Electric Company Limited, London, England Application January 23, 1951, Serial No. 207,319

Claims priority, application Great Britain February 1, 1950

6 Claims. (Cl. 332—11)

The present invention relates to signalling systems using pulse code modulation.

In pulse code modulation, each quantum of intelligence is usually conveyed by the presence or absence of a pulse in each of small plurality of recurrent (and usually regularly recurrent) pulse intervals, the pulse intervals occurring at fixed times and the nature of the intelligence determining in which of these intervals pulses are transmitted. Thus, the intelligence represented is unaffected by relatively large variations in the amplitude, width and shape of the pulses, such as may be produced by interference.

In one known system of pulse code modulation for multi-channel operation, each channel is periodically allotted a separate time interval, referred to as the channel interval. The channel intervals allotted to each channel are recurrent at a given frequency and the channel intervals of the several channels are interleaved with one another. Each channel interval carries one quantum of intelligence and for this purpose is divided into five equally spaced pulse intervals. The single pulses which may be transmitted in each of these pulse intervals are of like amplitude, width and waveform. It will be assumed that the intelligence to be transmitted is the instantaneous amplitude of a wave. Using five pulse intervals to define a quantum of intelligence merely by the presence or absence of a pulse in each pulse interval, thirty-two distinct values of such amplitude can be represented, including zero amplitude. In general, if $n$ be the number of pulses, the number of distinct amplitudes that can be represented, including zero amplitude, is equal to $2^n$. If the pulse intervals within the channel interval are numbered consecutively in order of occurrence, zero amplitude may be represented by no pulses in any of the intervals; amplitude value 1 may be represented by a pulse occurring in interval 1; amplitude value 2 may be represented by a pulse occurring in interval 2; amplitude value 3 may be represented by pulses occuring in intervals 1 and 2, and so on.

Instead of using the presence of absence of pulses in pulse intervals, to convey intelligence a positive or a negative-going pulse may be transmitted in each of the intervals, the signs of the pulses determining the nature of the intelligence.

The usual method of transmiting such pulses is by radio and in that case each pulse is represented by a burst of radio-frequency oscillation.

The present invention has for its object to provide improved means for generating pulse code signals.

According to the present invention, apparatus for generating pulse code modulated signals representative of a voltage level differing by S from a datum level comprises means for generating a succession of positive- and negative-going pulses occurring alternately, with the amplitude of the positive- and negative-going pulses decreasing progressively in such a manner that each has an amplitude which is half that of the preceding pulse of the same sign, a switching device which when actuated permits the application to a condenser of a charge dependent upon the amplitude of the positive- or negative-going pulses, means for subtracting the peak amplitudes of the negative- or positive-going pulses respectively from a succession of voltage values and for applying the resultant of such subtraction to cause or permit the switching device to be actuated during the occurrence of the next succeeding positive- or negative-going pulse respectively only when said resultant is a voltage of the same sign as S relative to the datum level, said voltage values being equal to S minus a voltage determined by the charge on said condenser at the times of occurrence of the said peak amplitudes respectively, and means for generating code pulses representative of the times of occurrence of those of said negative- or positive-going pulses respectively which do or do not effect an actuation of the switching device.

The invention also provides apparatus for decoding signals generated as set out in the preceding paragraph, the apparatus comprising means for generating a succession of positive- and negative-going pulses occurring alternately, with the amplitude of the positive- and negative-going pulses decreasing progressively in such a manner that each has an amplitude which is half that of the preceding pulse of the same sign, a switching device which when actuated permits the application to a condenser of a charge dependent upon the amplitude of the positive- or negative-going pulses, a circuit for applying the pulse code signals to actuate the said switching device, and means for restoring the charge on said condenser to a datum level after the said succession of pulses, the voltages on the condenser immediately before the restoration of charge thereon being representative of the magnitudes represented by the pulse code signals.

The invention will be described by way of example with reference to the accompanying drawings.

Figure 1:
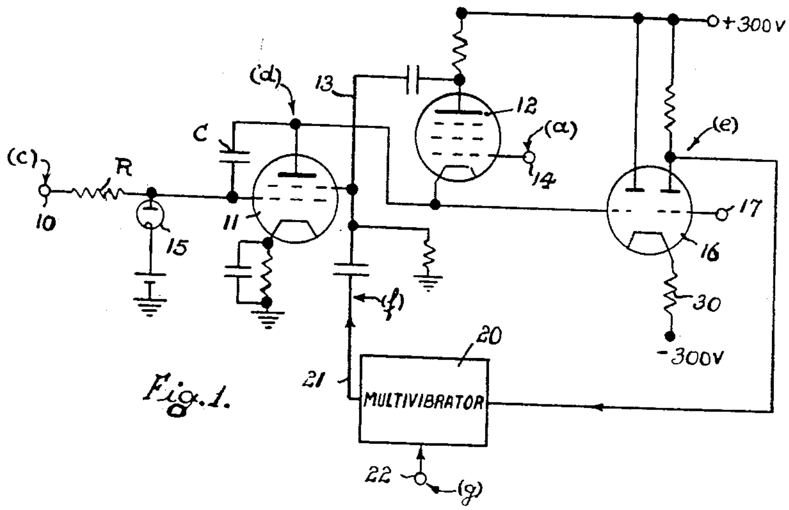
Figure 1 is a circuit diagram of an arrangement according to the invention.
Figure 3:
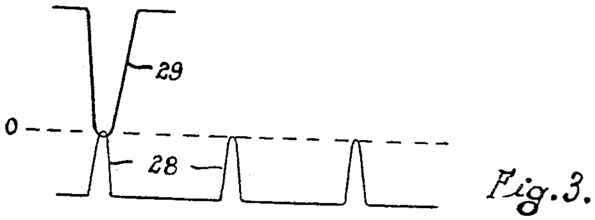
Figure 4:
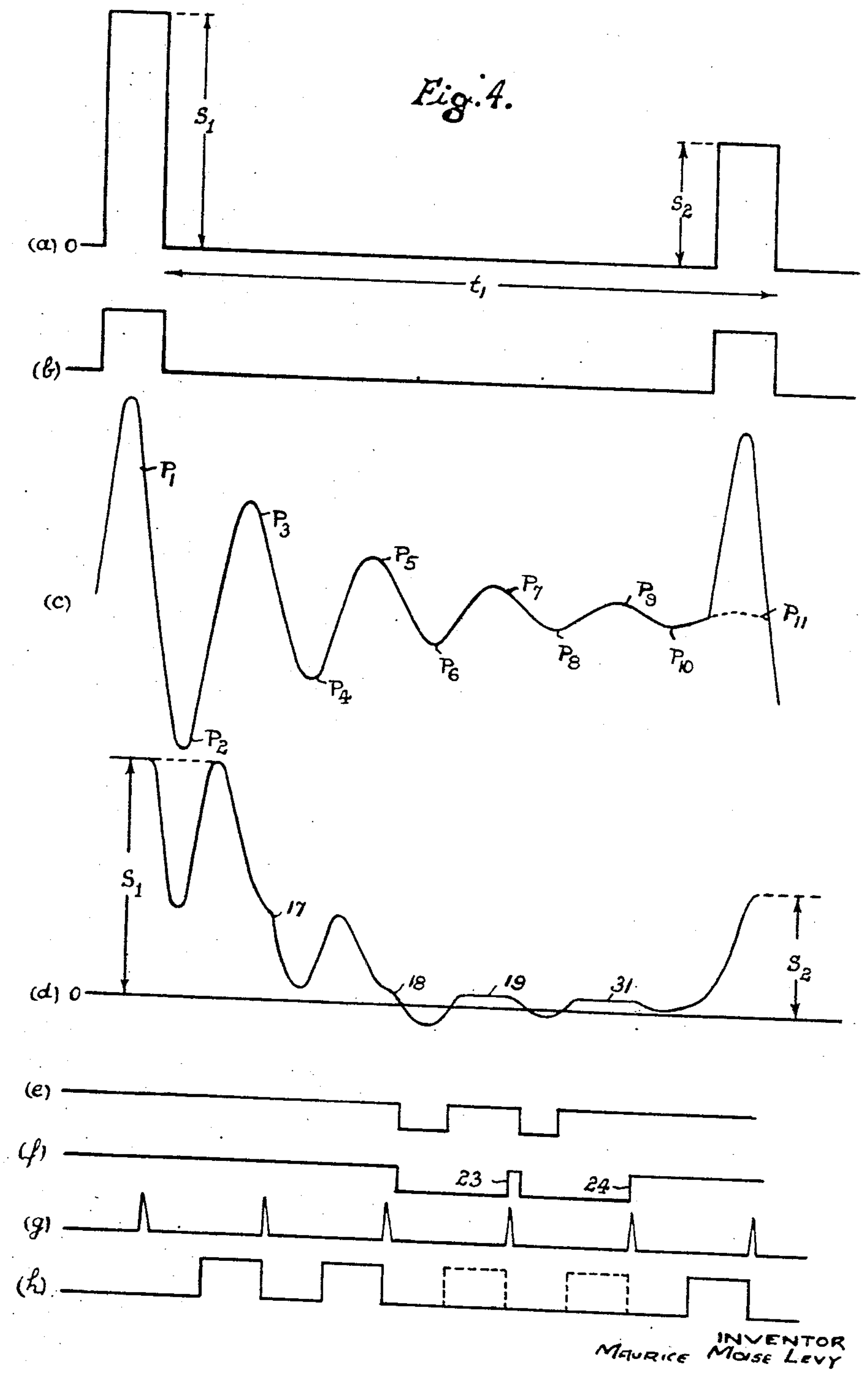
Figure 5:
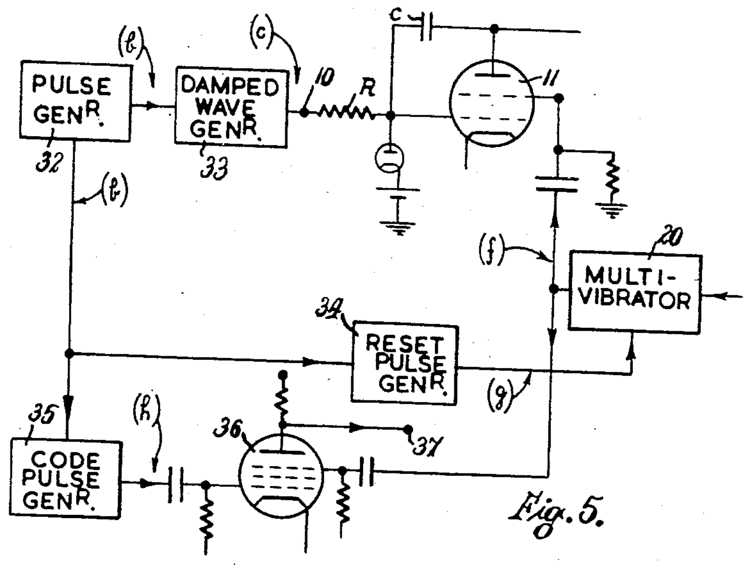
Figures 6, 7:
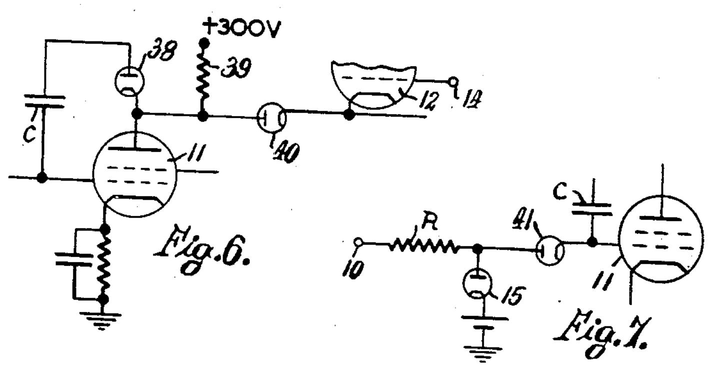
Figure 8:
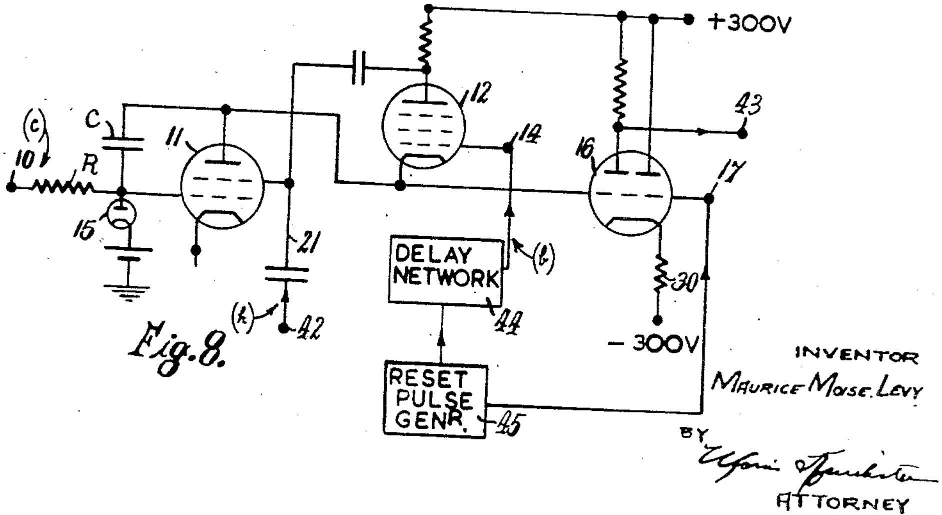

Figure 3 is a diagram illustrating the operation of a further modification of the arrangement of Figure 1, Figure 4 contains waveforms of voltages employed in the arrangement of Figure 1; it is to be noted that the various waveforms are not drawn to comparable scale in ordinates, Figure 5 shows a part of Figure 1 together with associated circuits, Figures 6 and 7 show modifications of parts of Figure 1, and Figure 8 shows a modification of the circuit of Figure 1 for use in decoding pulse code signals.

The various waveforms in Figure 4 are lettered *a* to *h* and the points in Figures 1, 5 and 8 at which these voltages appear are lettered correspondingly.

The arrangement to be describd is a part of a multi-channel signalling system using pulse code modulation and in Figure 4(*a*) $t_1$ represents the recurrence period of pulses whose amplitude is to be transmitted, this period being equal to the recurrence period of a channel interval. At the instant under consideration it is asumed that the voltage amplitude $S_1$ is to be transmitted. At *b* in Figure 4 is shown a train of pulses having a period equal to $t_1$ and of constant amplitude. These pulses may be generated in any convenient way. The pulses are applied to shock-excite a tuned circuit in known manner to give rise to a damped wave train such as is shown in *c* in Figure 4. Circuits for generating such damped trains are described for example in the specification of United States patent application No. 55,731, Patent No. 2,654,028.

The damping of the tuned circuit is so chosen that the amplitude of the positive and negative half-cycles decreases at such a rate that each peak has half the amplitude of the preceding peak of the same sign. It is to be noted that this is true of both the positive and negative half-cycles. The period of the damped train is made equal to the recurrence period of the code pulse intervals within the channel intervals.

The waveform of Figure 4(*c*) is applied to a terminal 10 in Figure 1 and thus through a resistor R to the control grid of a valve 11 biased to operate as a class C amplifier. This can be done either with the automatic bias circuit shown in the cathode lead, using a suitably high resistor which discharges only slowly the condenser in parallel therewith which is charged during positive half-cycles, or by a separate bias source. The anode of the valve 11 is connected to the control grid through a condenser C. The anode of this valve is also connected to the cathode of a further valve 12, the anode of which is connected through a condenser and connection 13 to the suppressor grid of the valve 11. The voltage of curve *a* in Figure 4 is applied to terminal 14 and thus to the control grid of the valve 12.

The valve 12 is arranged to be substantially an open circuit during the intervals between the positive peaks of Figure 4(*a*). During the first peak $P_1$ of the waveform *c* in Figure 4 the control grid of the valve 12 is driven positively by the voltage $S_1$ of Figure 4(*a*) and this renders the suppressor grid of the valve 11 so negative that the flow of anode current in this valve is prevented. Moreover, excessive positive swing of the control grid of the valve 11, which might cause a change in anode current at this time, can be arranged to be prevented by the flow of grid current in the valve or by a diode 15 suitably biased to allow the grid voltage to rise only a few volts. The valve 12 acts as a cathode follower and its cathode potential therefore rises substantially to the same extent as its control grid potential and current in the valve 12 charges the condenser C to a voltage $S_1$. The potential of the anode of the valve 11 therefore assumes the value $S_1$ above earth which is marked as the datum line zero in Figure 4(*a*).

When the first negative peak $P_2$ of Figure 4(*c*) occurs, the control grid of the valve 11 is driven negatively but since this valve operates in class C no appreciable change in anode current occurs. However the negative pulse is applied through the condenser C to the grid of the left-hand portion of a double valve 16. This valve is so arranged that normally the current flows entirely in the left-hand portion and substantially no current flows in the right-hand portion owing to the action of the bias resistor 30 and the low voltage point to which this resistor is connected. It is further arranged that current is cut off in the left-hand portion and flows in the right-hand portion of the valve 16 only when the control grid of the left-hand portion is brought to the level zero in Figure 4(*d*), which represents the voltage on the control grid of the left-hand portion of the valve 16. It will be seen from Figure 4(*d*) that the first negative peak $P_2$ of Figure 4(*c*) will not bring the potential of the control grid of the left-hand portion of the valve 16 below zero and will not, therefore, effect any change in the current flowing in the right-hand half of the valve 16. When the next positive peak $P_3$ of Figure 4(*c*) occurs the suppressor grid of the valve 11 is no longer held negative by a pulse of Figure 4(*a*), and the valve acts as a Miller integrator and discharges the condenser C by an amount dependent upon the energy content of the half-cycle $P_3$. The values of the condenser C and resistor R are so chosen that the effect of this discharging of the condenser C is to subtract from the voltage $S_1$ at the anode of the valve 11 a voltage equal to the amplitude of the pulse $P_2$ in Figure 4(*c*). In this way the voltage at the anode of the valve 11 reaches the value 17 in Figure 4(*d*).

The next negative-going pulse $P_4$ of Figure 4(*c*) again fails to drive the control grid of the valve 16 below the datum level as will be seen from Figure 4(*d*). Consequently during the next positive-going peak $P_5$ (Figure 4(*c*)) the valve 11 again acts as an integrator and again discharges the condenser C, this time by an amount equal to the amplitude of the peak $P_4$ to a value marked 18 in Figure 4(*d*).

It will be noted that the next negative-going peak $P_6$ in Figure 4(*c*) will drive the grid of the left-hand part of the valve 16 below the datum line zero in Figure 4(*d*). Whenever this happens it is required that there should be no integration by the valve 11 during the succeeding positive peak, in this case peak $P_7$, and that the voltage upon the condenser C should remain unchanged at the same level as before, in this case at the level of the point 18, this level being shown at 19 in Figure 4(*d*). Integration is prevented as follows:

When the peak $P_6$ drives the grid of the left-hand part of the valve 16 below the zero line, this part of the valve is cut off and owing to the interruption of current flow through the resistor 30 the current then flows in the right-hand half. The control grid of this half is maintained at a fixed potential by a suitable voltage applied to terminal 17. The voltage at the anode of the right-hand half of the valve 16 is shown in Figure 4(*e*) and it is seen that when the right-hand half becomes conducting at the time when the pulse $P_6$ crosses the zero line, a negative-going pulse is generated at the anode. As soon as the pulse $P_6$ recrosses the zero line the right-hand half is cut off, current again flowing in the left-hand half, and the negative pulse at the anode of the right-hand part of the valve 16 ceases. The negative pulse is applied to trigger a multivibrator 20 which generates at the output 21 a waveform as shown at *f* in Figure 4. Resetting pulses having the form shown at *g* in Figure 4 are applied to a terminal 22 of the multivibrator and serve to reset the multivibrator at predetermined times. Thus for example the pulse generated in the output 21 of the multivibrator by the peak $P_6$ is terminated by the resetting pulse at the point 23 in Figure 4(*f*). The negative-going pulse of Figure 4(*f*) is applied by lead 21 through a condenser to the suppressor grid of the valve 11 and is arranged to be of sufficient amplitude to prevent the valve 11 conducting during the next positive peak $P_7$.

During the part 19 of the waveform in Figure 4(*d*) the voltage remains constant since no integration takes place, and the next negative-going pulse $P_8$ again drives the grid of the left-hand half of the valve 16 over the zero line. A second negative-going pulse is then generated as shown in Figure 4(*e*) at the anode of the right-hand half of the valve 16 and a further negative-going pulse is thereby generated at the output 21 of the multivibrator. This second negative-going pulse is terminated by another resetting pulse at the point 24, and is applied as before to maintain the valve 11 cut off during the next positive peak $P_9$. It will be noted that the duration of the negative-going pulses in Figure 4(*e*) is dependent upon the time during which the negative-going peaks are below the datum line zero in Figure 4(*b*). This has no effect upon the result, however, since triggering of the multivibrator is effected by the leading edges of the pulses, and these always occur in time to prevent integration during the next positive peak.

Since integration of the next succeeding positive peak $P_9$ is prevented, the voltage on the condenser C remains at its previous level, indicated at 31 in Figure 4(*d*), during this peak. The negative peak $P_{10}$ does not reach zero and consequently no negative-going pulse is generated at the anode of the right-hand half of valve 16 at this time. It will be observed that it is necessary to integrate the positive peak $P_{11}$ because no further subtractions are required and the question whether a pulse has or has not to be generated at 21 in Figure 1 is determined by the negative peak $P_{10}$.

The procedure described repeats itself starting with the new level $S_2$ of Figure 4(*a*).

The desired code pulses may be generated from either of the waveforms shown in Figure 4(*e*) or 4(*f*). For example means may be provided for generating recurrent groups of pulses as shown in full and broken lines in Figure 4(*h*), there being in this example five such pulses in each group. These pulses are applied to one grid of a gating valve and the waveform of Figure 4(*f*) is applied to another grid in such a manner that the pulses of Figure 4(*h*) are allowed to pass and vary the anode current of the gating valve only whilst the curve of Figure 4(*f*) is positive. These five pulses may for example represent the magnitudes 16, 8, 4, 2 and 1 respectively, and the magnitude $S_1$ is then represented by the three pulses shown in full lines in Figure 4(*h*) representing a magnitude of 25.

Referring to Figure 5, pulses of the waveform *b* are generated in a pulse generator 32 and are fed to a damped wave generator 33 which generates the trains of waveform *c*. The pulses from 32 are also applied to control a reset pulse generator 34 which generates the waveform *g* for application to the multivibrator 20. Pulses from 32 are also applied to control the generation in a pulse generator 35 code pulses of waveform *h* which are applied to the control grid of a gating valve 36. The waveform *f* is applied from the multivibrator 20 to the suppressor grid of the valve 36. The pulse code signals are obtained at terminal 37.

Of course it will be understood that by giving the five pulses of Figure 4(*h*) suitably different significances from those above mentioned, the pulses shown in broken lines in Figure 4 may be said to represent the magnitude $S_1$. The way in which such broken line pulses may be generated from the pulses of Figure 4(*e*) or 4(*f*) will be obvious.

Instead of transmitting the intelligence by the presence or absence of pulses in predetermined pulse intervals it may be conveyed by transmitting pulses in all the intervals, the nature of the intelligence being determined by the sign of the pulse. The way in which such positive and negative pulses can be generated will be well understood.

The waveform applied to the terminal 10 in Figure 1 may take many forms other than that shown in Figure 4(*c*), for instance it may consist of distinct positive- and negative-going pulses. The positive-going pulses may be generated separately from the negative-going pulses and subsequently combined therewith. One way of generating such positive and negative pulses is to generate a train of pulses of the appropriate recurrence frequency and constant amplitude and to effect the desired decrease of amplitude by applying the pulses to the control grid of a valve and applying a suitable exponential waveform to the suppressor grid of the valve to lower progressively the clipping level. The exponential waveform may be produced by allowing a condenser to charge or discharge through an appropriate resistance.

It will be seen that the valve 11 in Figure 1 constitutes a switching device which is normally actuated to permit the charging of the condenser C to a voltage dependent upon the amplitude of the positive-going peaks $P_3$, $P_5$ etc. in Figure 4(*c*). The negative-going peaks $P_2$, $P_4$ etc. in Figure 4(*c*) are subtracted from the charge existing upon the condenser C, which initially corresponds to the value $S_1$, and so long as the resultant of this subtraction remains positive (of the same sign as $S_1$), the switching device 11 is allowed to remain actuated so that integration, and consequently discharge of the condenser C, takes place. As soon, however, as the resultant becomes negative (of opposite sign to $S_1$), the switching device 11 is arranged by the negative pulse applied from the multivibrator 20 to the suppressor grid to prevent integration of the next succeeding positive-going pulse. The inverse arrangement in which the subtractions are performed by the positive peaks and the negative pulses are integrated may be used if desired.

Provided that the amplification of the valve 11 is high the changes in voltage of the control grid of this valve are not significant in comparison with the amplitude of the larger peaks in Figure 4(c). In comparison with the amplitude of the smaller peaks, however, which may for example be only about one hundredth of that of the peak $P_2$, the changes in voltage may be significant and may impair the accuracy of the integration. In this case the modification of Figure 2 may be used. The valve 11 is replaced by three valves 25, 26 and 27 (three are used rather than two because of the phase reversals that occur in each stage). The valves 25 and 26 are biased to operate as normal amplifiers and the valve 27 is biased to operate in class C. The condenser O is connected between the anode of valve 27 and the control grid of valve 23.

Some inaccuracy may arise from the variations in the steepness with which peaks cross the zero line in Figure 4(d). Thus the steepness in the case of peak $P_6$ of Figure 4(c) is much greater than that in the case of peak $P_8$. Uncertainty in the operation of the multivibrator 20 of Figure 1 may result. In order to overcome this uncertainty, instead of applying a fixed potential to the terminal 17 in Figure 1 there may be applied a train of pulses 28 of constant amplitude as shown in Figure 3. It is arranged that the tips of these pulses 28 lie upon the zero line O in Figure 4(d) which is reproduced as a broken line in Figure 3. The intersection of pulses 28 with pulses 29 (corresponding to a peak such as $P_6$ in Figure 4(c)) is then substantially independent of the shape of the pulse 29.

Another way of using the circuit of Figure 1 is to apply only the positive peaks of Figure 4(c) to terminal 10 and to apply the negative peaks, reversed in sense, to the terminal 17. Whether the current in the valve 16 switches over from the left to the right half then depends upon the relative values of the voltages on the two control grids so that the effect is as before one of subtraction.

In the description of Figure 1 it was stated that the valve 11 operates in class C and the assumption is made that integration occurs, assuming that the suppressor grid is not held negative, when the control grid is driven positively and that no current flows in the valve when the control grid is driven negatively. This assumption is sufficiently accurate with relatively large amplitudes of swing of the grid voltage, but with small amplitudes it may give rise to an undesirable error owing to the fact that the cut-off of the valve is not sharp.

In order to overcome this, as shown in Figure 6, a diode 38 may be connected between the anode of the valve 11 and the condenser C, the cathode of the diode being connected to the valve anode, and a load resistor 39 may be connected between the valve anode and the positive high tension terminal. The valve 11 is then biased to operate in class A. Integration takes place only when the anode of valve 11 is more negative than the anode of the diode and the cut-off can be made relatively sharp. This circuit has the disadvantage that the voltage on the control grid of valve 11 at which the diode is just cut off is dependent upon the charge upon the condenser C. The disadvantage can be removed by making the load resistor 39 of large value and by connecting a further diode 40 between the anode of valve 11 and the cathode of valve 12, the anode of this diode being connected to the anode of valve 11.

Figure 2:
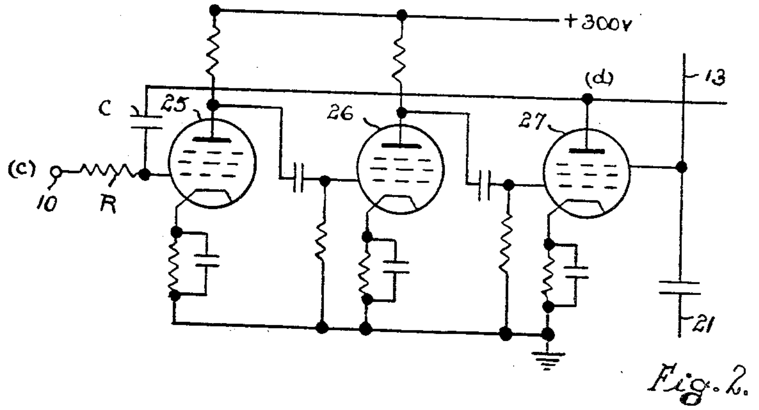
Figure 2 shows a modification of a part of Figure 1.

A like modification can be made to the circuit of Figure 2, the diode then being connected between the anode of the valve 27 and the condenser C. The anode of the valve 27 may be provided with a load resistor, preferably of high value, or such load resistor may be omitted.

In either of the circuits of Figure 1 or 2, when a diode is used as described, it can be arranged that in order to prevent integration the anode of the valve 11 or 27 is made more positive, thus cutting off the diode. Preferably the negative bias is applied at the same time to the suppressor grid as described.

Although it is preferred to connect the diode as described, an alternative, shown in Figure 7, is to connect a diode 41 between the resistor R and the junction of the condenser C and control grid of the valve 11, the cathode of the diode being connected to the said junction. Instead of applying negative pulses from 20 in Figure 1 to the suppressor grid of valve 11 in order to cut off this valve, these pulses, if of small amplitude, may be applied to the anodes of the diodes 15 and 41 in Figure 7. The suppressor grid of valve 11 can be dispensed with and the connection to the anode of valve 12 may be taken to the anodes of the diodes 15 and 41.

The circuits described may be used for decoding pulse code signals as shown in Figure 8. Pulses such as at *b* in Figure 4 generated in a pulse generator 45 are applied as resetting pulses to the terminal 14 to restore the charge on the condenser C periodically to a predetermined level. The multivibrator 20 of Figure 1 is omitted and the coded pulses are applied in positive-going sense to a terminal 42, and thus to lead 21, in order to permit integration of the waveform of Figure 4(c), which is applied to terminal 10 as before, when such coded pulses occur. The drop in voltage across the condenser C before resetting pulses are applied corresponds to the magnitude represented by the coded pulses applied. This drop in voltage appears on the left hand grid of valve 16, the left hand anode being connected to the positive high tension terminal through a load resistor and to an output terminal 43. The right hand anode is connected directly to the said positive terminal and just before a resetting pulse is applied at 14 a negative pulse is applied at 17 to cut off the right hand half of valve 16. The left hand half of this valve which is normally cut off then conducts and the voltage generated at the output terminal corresponds to the desired magnitude. The necessary time delay may be produced by a delay network 44 connected between the generator 45 and the terminal 14.

The circuit of Figure 2 can of course be used in this case also instead of the single valve 11 of Figure 8.

The modification in which a diode 38 (Figure 6) is associated with the valve 11 is suitable for use in decoding in the manner described. When such a diode is used with its cathode connected to the anode of the valve 11, the coded pulses are preferably also applied through a cathode-follower valve to raise the potential of the anode of the valve 11 when coded pulses do not occur and when, therefore, integration is not required.

It has hitherto been assumed that the voltage levels, such as $S_1$, $S_2$ in Figure 4, are regularly recurrent. This is, however, not necessary. In some cases, for instance in remote metering where it may be required to give indication of a meter reading only when some upper or lower limit is passed, the voltage levels to be transmitted occur at random intervals. It is then necessary to transmit a "start" or synchronising signal which will identify the pulses of the pulse code signal. Thus in the absence of such a synchronising signal, it might not be possible to distinguish the individual pulses of waveform *h* from one another and it would not be possible to generate the waveform *c* in time for this to be used for decoding.

The synchronising signal may have the relative phase of the waveform *b* for example, and its waveform is made suitably different from that of the code pulses to enable it to be selected in known manner. The synchronising signal, suitably delayed, may be used to generate the reset pulse.

I claim:

1. Apparatus for generating pulse code modulated signals representative of a voltage level differing by S from a datum level, comprising means for generating a succession of positive- and negative-going pulses occurring alternately, the amplitude of each pulse being half that of the preceding pulse of the same sign, an electron discharge valve having at least two control electrodes and an anode, a condenser connected between one of said control electrodes and said anode, means to apply said voltage level to determine the initial potential of said anode, means to apply said succession to said one of said control electrodes, said positive-going pulses varying the charge on said condenser in dependence on the energy content of said positive-going pulses at times when said valve is conducting, means responsive to the difference between the peak amplitude generated at said anode by said negative-going pulses and the instantaneous value of the potential of said anode to generate a control pulse when said difference is of opposite sign to S relatively to said datum value, means to apply said control pulse to the other control electrode of said valve to cut off said valve and thereby prevent variation of charge of said condenser in response to said positive-going pulses, and means for generating a code pulse each time the sign of said difference bears a predetermined relationship to the sign of S.

2. Apparatus for generating pulse code modulated signals representative of a voltage level differing by S from a datum level, comprising means for generating a succession of positive- and negative-going pulses occurring alternately, the amplitude of each pulse being half that of the preceding pulse of the same sign, an odd plurality of electron discharge valves connected in cascade, a condenser connected between the control grid of the first valve and the anode of the last valve, means to apply said voltage level to determine the initial potential of the anode of said last valve, means to apply said succession to said control grid, said positive-going pulses varying the charge on said condenser in dependence on the energy content of said positive-going pulses at times when said valve is conducting, means responsive to the difference between the peak amplitude generated at said anode by said negative-going pulses and the instantaneous value of the potential of said anode to generate a control pulse when said difference is of opposite sign to S relatively to said datum value, means to apply said control pulse to a control electrode of said last valve to cut off this valve and thereby prevent variation of charge of said condenser in response to said positive-going pulses and means to generate a code pulse at each occurrence of one of two conditions, namely said difference being of the same sign as and of opposite sign to S.

3. Apparatus for generating a code signal representative of a voltage level differing by S from a datum level, comprising pulse generating means generating a first and a second set of pulses, the pulses of one of the sets occurring alternately with those of the other set and the amplitude of each pulse after the first in each set being half that of the preceding pulse of the same set, a condenser, a switching device connected to control the application of said pulses of said first set to charge said condenser, means generating a succession of voltage values equal respectively to S minus a voltage determined by the charge on said condenser at the times of occurrence of said pulses of said second set, a comparison circuit for subtracting the peak amplitudes of said pulses of said second set respectively from said voltage values to produce a resultant, means responsive to the sign of said resultant relatively to said datum level to generate a control pulse, constituting also a code pulse, each time the sign of said resultant bears a predetermined relationship to the sign of S, and means coupling said responsive means to said switching device to apply said control pulses to determine whether said condenser is charged by the pulse of said first set next following the pulse of said second set by which said control pulse is generated.

4. Apparatus for generating a code signal representative of a voltage level differing by S from a datum level, comprising pulse generating means generating a first and a second set of pulses, the pulses of one of the sets occurring alternately with those of the other set and the amplitude of each pulse after the first in each set being half that of the preceding pulse of the same set, a condenser, a switching device connected to control the application of said pulses of said first set to charge said condenser, means generating a succession of voltage values equal respectively to S minus a voltage determined by the charge on said condenser at the times of occurrence of said pulses of said second set, a comparison circuit for subtracting the peak amplitudes of said pulses of said second set respectively from said voltage values to produce a resultant, means responsive to the sign of said resultant relatively to said datum level to generate a control pulse each time the sign of said resultant bears a first predetermined relationship to the sign of S, means coupling said responsive means to said switching device to apply said control pulses to prevent the charging of said condenser by the pulse of said first set next following the pulse of said second set by which said control pulse is generated, and code pulse generating means connected to generate a code pulse each time the sign of said resultant bears a second predetermined relationship to the sign of S.

5. In a system of communication in which the instantaneous amplitude of a complex wave is transmitted by a sequence of code pulses, such sequence having a predetermined recurrence frequency, terminal apparatus comprising a first thermionic valve having an anode, a cathode, a control grid and a suppressor grid, a condenser connected between said anode and said control grid, a damped train generator generating a first and a second set of pulses, the pulses of one of the sets occurring alternately with those of the other set and the amplitude of each pulse after the first in each set being half that of the preceding pulse of the same set, means coupling said generator to said control grid, a switching device comprising a second thermionic valve having an anode, a cathode and a control grid, means coupling said suppressor grid to the anode of said second valve, means coupling the anode of said first valve and the cathode of said second valve, a third thermionic valve having two anodes, a cathode and a control grid controlling the electron path to each anode, an output terminal, means connecting one of the said two anodes to said output terminal, means connecting the cathode of said second valve to one of the control grids of said third valve, a source of pulses of the said recurrence frequency, means coupling said source to the control grid of said second valve, and means to apply said code pulses to said suppressor grid to actuate said switching device.

6. Apparatus for generating pulse code modulated signals representative of a voltage level differing by S from a datum level, comprising means for generating a succession of positive- and negative-going pulses occurring alternately, the amplitude of each pulse being half that of the preceding pulse of the same sign, an electron discharge valve having at least two control electrodes and an anode, a condenser connected between one of said control electrodes and said anode, means to apply said voltage level to determine the initial potential of said anode, means to apply said succession to said one of said control electrodes, said positive-going pulses varying the charge on said condenser in dependence on the energy content of said positive-going pulses at times when said valve is conducting, means responsive to the difference between the peak amplitude generated at said anode by said negative-going pulses and the instantaneous value of the potential of said anode to generate a control pulse, constituting also a code pulse, each time said difference is of opposite sign to S relatively to said datum value, and means to apply said control pulse to the other control electrode of said valve to cut off said valve and thereby prevent variation of charge of said condenser in response to said positive-going pulses.

References Cited in the file of this patent

UNITED STATES PATENTS

| Number | Name | Date |
|---|---|---|
| 2,514,671 | Rock | July 11, 1950 |
| 2,592,061 | Oxford | Apr. 8, 1952 |